United States Patent
Mun et al.

(10) Patent No.: US 12,421,429 B2
(45) Date of Patent: Sep. 23, 2025

(54) (METH)ACRYLIC ADHESIVE FILM, OPTICAL MEMBER COMPRISING THE SAME, AND OPTICAL DISPLAY APPARATUS COMPRISING THE SAME

(71) Applicant: SAMSUNG SDI CO., LTD., Yongin-si (KR)

(72) Inventors: Sung Hyun Mun, Suwon-si (KR); Do young Kim, Suwon-si (KR); Kyoung Gon Park, Suwon-si (KR); Dong Myeong Shin, Suwon-si (KR); Il Jin Kim, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 36 days.

(21) Appl. No.: 17/723,120

(22) Filed: Apr. 18, 2022

(65) Prior Publication Data
US 2022/0332986 A1 Oct. 20, 2022

(30) Foreign Application Priority Data
Apr. 19, 2021 (KR) ........................ 10-2021-0050725

(51) Int. Cl.
*C09J 7/22* (2018.01)
*C09J 7/38* (2018.01)
*C09J 133/08* (2006.01)
*G02B 1/14* (2015.01)

(52) U.S. Cl.
CPC ............... *C09J 133/08* (2013.01); *C09J 7/22* (2018.01); *C09J 7/385* (2018.01); *G02B 1/14* (2015.01); *C09J 2301/302* (2020.08); *C09J 2301/408* (2020.08); *C09J 2400/143* (2013.01); *C09J 2433/00* (2013.01); *C09J 2475/006* (2013.01); *Y10T 428/2891* (2015.01)

(58) Field of Classification Search
None
See application file for complete search history.

(56) References Cited

U.S. PATENT DOCUMENTS

| | | | | |
|---|---|---|---|---|
| 5,162,087 A | * | 11/1992 | Fukuzawa | C09J 133/08 524/439 |
| 2006/0134362 A1 | * | 6/2006 | Lu | C09J 7/385 428/40.1 |
| 2016/0122600 A1 | * | 5/2016 | Moon | C09J 7/22 428/354 |
| 2022/0220271 A1 | * | 7/2022 | Shin | C08J 7/046 |

FOREIGN PATENT DOCUMENTS

| | | |
|---|---|---|
| CN | 105567137 A | 5/2016 |
| KR | 10-2007-0055363 A | 5/2007 |

OTHER PUBLICATIONS

Chinese Office Action dated Jul. 22, 2023, issued in corresponding Chinese Patent Application No. 202210409135.8 (7 pages).

* cited by examiner

*Primary Examiner* — Anish P Desai
(74) *Attorney, Agent, or Firm* — Womble Bond Dickinson (US) LLP (57) ABSTRACT

A (meth)acrylic adhesive film, an optical member including the same, and an optical display apparatus including the same are provided. The (meth)acrylic adhesive film includes organic particles, and further includes greater than 0 wt % to 5 wt % of inorganic particles. The (meth)acrylic adhesive film has a haze of 1% or less and an initial dent formation height of 4.5 cm or more.

15 Claims, 2 Drawing Sheets

(METH)ACRYLIC ADHESIVE FILM, OPTICAL MEMBER COMPRISING THE SAME, AND OPTICAL DISPLAY APPARATUS COMPRISING THE SAME

CROSS-REFERENCE TO RELATED APPLICATION

This application claims priority to and the benefit of Korean Patent Application No. 10-2021-0050725, filed on Apr. 19, 2021 in the Korean Intellectual Property Office, the entire disclosure of which is incorporated herein by reference.

1. FIELD

Aspects of embodiments of the present invention relate to a (meth)acrylic adhesive film, an optical member including the same, and an optical display apparatus including the same.

2. DESCRIPTION OF THE RELATED ART

An optical display apparatus includes display elements including a window film, a conductive film, and an organic light emitting diode. In the optical display apparatus, various display elements may be adhesively attached via an optically clear adhesive (OCA) film. Recently, a flexible optical display apparatus has been developed as an optical display apparatus. Thus, it is desirable that the adhesive film also have good flexural reliability.

A plastic film or a very thin glass plate is disposed on an outermost side of a flexible optical display in order to secure flexural reliability. As a result, the outermost side of the flexible optical display may be vulnerable to external impact. As such, there is a need for a process of adhesively attaching a separate protective film to the outermost side of the flexible optical display.

The background technique of the present invention is disclosed in Korean Patent Laid-open Publication No. 10-2007-0055363, and the like.

SUMMARY

According to an aspect of embodiments of the present invention, a (meth)acrylic adhesive film that exhibits good impact resistance and optical characteristics over the entire area thereof is provided.

According to another aspect of embodiments of the present invention, a (meth)acrylic adhesive film that has good flexural reliability is provided.

According to an aspect of one or more embodiments of the present invention, a (meth)acrylic adhesive film is provided.

A (meth)acrylic adhesive film according to one or more embodiments includes organic particles, and further includes greater than 0 wt % to 5 wt % of inorganic particles, and has a haze of 1% or less and an initial dent formation height of 4.5 cm or more, as measured on a specimen prepared by sequentially stacking the adhesive film having a thickness of 25 μm and a 100 μm thick polyurethane based film having a Young's modulus of 80 MPa to 500 MPa at 25° C. on a 50 μm thick polyethylene terephthalate film, wherein the dent is a dent depth on the polyethylene terephthalate film upon dropping a pen including a ball having a diameter of 0.7 mm and a circular cross-section onto an upper surface of the polyurethane based film of the specimen in a vertical direction.

In one or more embodiments, the inorganic particles may have a smaller average particle diameter than the organic particles.

In one or more embodiments, a difference in average particle diameter between the inorganic particles and the organic particles may be about 50 nm or more.

In one or more embodiments, the inorganic particles may have an average particle diameter of about 10 nm to about 1,000 nm, and the organic particles may have an average particle diameter of about 100 nm to about 1,000 nm.

In one or more embodiments, the organic particles may be present in an amount of about 50 parts by weight to about 150 parts by weight relative to 100 parts by weight of the inorganic particles.

In one or more embodiments, the inorganic particles may include silica.

In one or more embodiments, the inorganic particles may not be subjected to surface treatment with a (meth)acrylate compound or may be subjected to surface treatment with the (meth)acrylate compound.

In one or more embodiments, the organic particles may include core-shell type organic particles satisfying the following Equation 1:

$$Tg(c) < Tg(s),$$

where $Tg(c)$ is a glass transition temperature of a core (unit: °C.), and $Tg(s)$ is a glass transition temperature of a shell (unit: °C.).

In one or more embodiments, the organic particles may be present in an amount of about 0.1 wt % to about 10 wt % in the adhesive film.

In one or more embodiments, the adhesive film may be formed of an adhesive composition including the inorganic particles, the organic particles, and a polymerized product of a monomer mixture for a hydroxyl group-containing (meth)acrylic copolymer.

In one or more embodiments, the monomer mixture may include a hydroxyl group-containing (meth)acrylate and an alkyl group-containing (meth)acrylate.

In one or more embodiments, the monomer mixture may include an alkylene oxide group-containing monomer.

In one or more embodiments, the adhesive composition may further include at least one selected from among a photoinitiator and a crosslinking agent.

In one or more embodiments, the adhesive film may have a modulus of about 50 kPa to about 1,000 kPa at −20° C. and a modulus of about 10 kPa to about 200 kPa at 60° C.

According to another aspect of one or more embodiments of the present invention, an optical member is provided.

In one or more embodiments, an optical member includes an adherend and the (meth)acrylic adhesive film according to an embodiment of the present invention stacked on at least one surface of the adherend.

According to another aspect of one or more embodiments of the present invention, an optical display apparatus including an adhesive film according to an embodiment of the present invention or an optical member according to an embodiment of the present invention is provided.

DETAILED DESCRIPTION

Herein, some embodiments of the present invention will be described in further detail. However, it is to be understood that the present invention is not limited to the following embodiments and may be embodied in different ways.

Herein, "(meth)acryl" refers to acryl and/or methacryl.

Herein, "copolymer" may include a prepolymer, an oligomer, a polymer, or a resin.

Herein, "average particle diameter" of organic nanoparticles refers to a particle diameter thereof, as measured in a water-based or organic solvent using a Zetasizer nano-ZS (Malvern Co., Ltd.) and represented by a Z-average value, and observed by SEM/TEM.

Herein, "modulus" of an adhesive film means storage modulus (G') thereof. Storage modulus of the adhesive film may be measured by the method described below.

Herein, "glass transition temperature (Tg) in a homopolymer phase" may mean a glass transition temperature measured with respect to a homopolymer of a target monomer using a DSC Discovery (TA Instrument Inc.). Specifically, the homopolymer of the target monomer may be heated to 180° C. at a rate of 20° C./min, slowly cooled to −100° C. at the same rate, and heated again to 100° C. at 10° C./min in order to obtain an endothermic transition curve. Then, an inflection point of the endothermic transition curve may be determined as the glass transition temperature.

Herein, an average particle diameter of inorganic nanoparticles refers to D50, which was measured using a particle analyzer (Nanotrac, Microtrac Co., Ltd.) after 2,500 g of the inorganic nanoparticles were dispersed in 2,500 g of 4-hydroxybutyl acrylate (4-HBA) as a solvent. Here, D50 may mean a diameter corresponding to 50 wt % in a graph, in which the x-axis represents the diameter of the inorganic nanoparticles, and the y-axis represents the ratio of the inorganic nanoparticles having a corresponding diameter.

Herein, "Young's modulus" of a polyurethane based film was evaluated on a V-type specimen in accordance with ASTM D638, specifically through a tensile test experiment at 25° C. and at a tensile rate of 100 mm/min using a UTM system (Intron Technology Co., Ltd.).

Herein, "storage modulus" of a polyurethane based film was measured with respect to the base layer using a dynamic mechanical analyzer (DMA), specifically in a tension test mode at a frequency of 1 Hz while raising the temperature from −70° C. to 120° C. at a heating rate of 2° C./min, and means storage modulus at −20° C. and storage modulus at 85° C.

As used herein to represent a specific numerical range, the expression "X to Y" means a value greater than or equal to X and less than or equal to Y (X≤ and ≤Y).

Embodiments of the present invention provide a (meth)acrylic adhesive film that exhibits good impact resistance and good flexural reliability over the entire area thereof. The "(meth)acrylic adhesive film" means an adhesive film containing (meth)acrylic moieties or 80 wt % to less than 100% of a (meth)acrylic compound-derived component.

As described below with regard to impact resistance, embodiments of the present invention provide a (meth) acrylic adhesive film that secures good properties in both impact resistance and flexural reliability over the entire area of the (meth)acrylic adhesive film in evaluation of impact resistance on a specimen obtained by sequentially stacking a polyurethane based film having Young's modulus in a specific range, the adhesive film, and a polyethylene terephthalate film. By securing good impact resistance over the entire area of the (meth)acrylic adhesive film, the (meth) acrylic adhesive film can secure reliability of an optical display apparatus adopting the (meth)acrylic adhesive film, when external impact is applied to a certain portion of the adhesive film.

In addition, embodiments of the present invention provide a (meth)acrylic adhesive film that exhibits good optical characteristics. Accordingly, the adhesive film may be disposed at any of various places in an optical display, thereby improving applicability of the adhesive film.

In an embodiment, the (meth)acrylic adhesive film has a haze of 1% or less. For example, the (meth)acrylic adhesive film may have a haze of 0.01%, 0.05%, 0.1%, 0.2%, 0.3%, 0.4%, 0.5%, 0.6%, 0.7%, 0.8%, 0.9%, or 1%, and, in an embodiment, 0.01% to 1%. Within this range, the (meth) acrylic adhesive film can exhibit good optical transparency, thereby securing good optical effects when stacked on a polyurethane film described below.

Herein, a (meth)acrylic adhesive film according to an embodiment of the present invention will be described.

The (meth)acrylic adhesive film (herein, "adhesive film") according to an embodiment includes organic particles, and further includes greater than 0 wt % to 5 wt % of inorganic particles. The adhesive film is an organic/inorganic hybrid adhesive film.

With greater than 0 wt % to 5 wt % of the inorganic particles, the adhesive film allows good dispersion of both the organic particles and the inorganic particles therein without affecting flexural reliability by the organic particles, thereby securing good properties in both impact resistance and flexural reliability over the entire area of the adhesive film. One or more embodiments of the present invention include a certain content (e.g., a specific content) of the inorganic particles while using typical organic particles to maintain flexural reliability, such that the organic particles and the inorganic particles formed of different materials can be effectively dispersed in the adhesive film, thereby securing the aforementioned effects of the present invention. In an embodiment, the inorganic particles are present in an amount of, for example, 0.1 wt %, 0.5 wt %, 1 wt %, 1.25 wt %, 1.5 wt %, 1.75 wt %, 2 wt %, 2.25 wt %, 2.5 wt %, 2.75 wt %, 3 wt %, 3.25 wt %, 3.5 wt %, 3.75 wt %, 4 wt %, 4.25 wt %, 4.5 wt %, 4.75 wt %, or 5 wt %, and, in an embodiment, 1 wt % to 5 wt %, in the adhesive film.

In an embodiment, the adhesive film may have an initial dent formation height of 4.5 cm or more, as measured on a specimen prepared by sequentially stacking the adhesive film having a thickness of 25 μm and a 100 μm thick polyurethane based film having a Young's modulus of 80 MPa to 500 MPa at 25° C. on a 50 μm thick polyethylene terephthalate film, in which the dent means a dent depth on the polyethylene terephthalate film upon dropping a pen including a ball having a diameter of 0.7 mm and a circular cross-section onto an upper surface of the polyurethane based film of the specimen in a vertical direction. Within this range, the adhesive film can prevent or substantially prevent dent formation when a user uses a stylus pen on an optical display apparatus including the same.

The adhesive film may have an initial dent formation height of, for example, 4.5 cm, 5 cm, 5.5 cm, 6 cm, 6.5 cm, 7 cm, 7.5 cm, 8 cm, 8.5 cm, 9 cm, 9.5 cm, or 10 cm, and, in an embodiment, 4.5 cm to 10 cm. The initial dent formation height may be measured at 23° C. to 27° C., and, in an embodiment, at 25° C., with reference to an experimental example described below with respect to FIGS. 1A and 1B. The dent may be evaluated based on a dent depth in a profile through a 3D microscope.

In the present invention, in evaluation of impact resistance of the adhesive film, a polyurethane based film having a Young's modulus at 25° C. of 80 MPa to 500 MPa is used. The inventors of the present invention confirmed that the polyurethane based film having a Young's modulus within this range can improve low temperature and flexural reliability of a laminate including the polyurethane film, for example, a laminate of the polyurethane film and an adhesive film. In an embodiment, the laminate of the polyurethane film having a Young's modulus within the above range and the adhesive film according to the present invention exhibits good properties in terms of low temperature and flexural reliability.

Here, "low temperature and flexural reliability" was evaluated depending on generation of cracks at a bent portion of a specimen (length×width: 10 cm×5 cm), which was prepared by stacking a polyethylene terephthalate film (thickness: 75 μm) on a lower surface of a laminate of a polyurethane based film (thickness: 100 μm) and an adhesive film (thickness: 25 μm), upon repetition of 100,000 cycles of folding and unfolding the specimen towards the polyethylene terephthalate film side such that the bent portion of the specimen had a radius of curvature of 1.5 mm, in which each cycle refers to an operation of folding the specimen in half in the longitudinal direction thereof, followed by unfolding the specimen. Generation of no cracks even after 100,000 cycles of folding indicates good low temperature and flexural reliability.

In an embodiment, the polyurethane based film has a Young's modulus at 25° C. of 80 MPa to 300 MPa, and, in an embodiment, 100 MPa to 200 MPa.

In an embodiment, the polyurethane based film may include a cast polyurethane (CPU) film manufactured through solution casting. Solution casting is a process of manufacturing a polyurethane based film by placing a solution containing a polyurethane resin (including a polyol, an isocyanate curing agent, additives, and the like) and a solvent on a non-adhesive surface, followed by volatilization of the solvent and heat curing. The inventors of the present invention confirmed that it is easier for the polyurethane film manufactured through solution casting to secure good external appearance than for a thermoplastic polyurethane (TPU) film manufactured through a typical melt extrusion method. The cast polyurethane film (CPC) manufactured through solution casting exhibits no stripe pattern, gel, and/or opaqueness when irradiated with light, thereby assisting in improvement in external appearance of a surface protective film, as compared with the thermoplastic polyurethane (TPU) film manufactured through melt extrusion.

The polyurethane based resin may be prepared from a bi- or higher polyfunctional polyol and a bi- or higher polyfunctional isocyanate. The polyol may include at least one selected from among an aromatic polyol, an aliphatic polyol, and an alicyclic polyol. In an embodiment, the polyurethane is prepared from at least one selected from among an aliphatic polyol and an alicyclic polyol. The polyol may include at least one selected from among a polyester diol, a polycarbonate diol, a polyolefin diol, a polyether diol, a polythioether diol, a polysiloxane diol, a polyacetal diol, and a polyesteramide diol, without being limited thereto. The polyfunctional isocyanate may include a certain aliphatic, alicyclic or aromatic isocyanate. A chain extender may include a diol, for example, an aliphatic diol, an amino alcohol, a diamine, a hydrazine, a hydrazide, and a mixture thereof. The thermoplastic polyurethane film may further include a tin compound, such as a tin salt of carboxylic acid, an amine, such as dimethyl cyclohexylamine and triethylenediamine, and the like, as a catalyst for promoting formation of a urethane bond. The thermoplastic polyurethane film may further include other typical components, for example, a surfactant, a flame retardant, fillers, a pigment, and the like.

For the polyurethane based film, a Young's modulus at 25° C. within the range of 80 MPa to 500 MPa can be achieved through adjustment of the molecular weight of the polyol in preparation of the polyurethane based film through solution casting. Adjustment of the molecular weight of the polyol can be easily performed by a well-known method in the art.

In an embodiment, the adhesive film may have a modulus at 25° C. of about 10 kPa to about 100 kPa, for example, 10 kPa, 15 kPa, 20 kPa, 25 kPa, 30 kPa, 35 kPa, 40 kPa, 45 kPa, 50 kPa, 55 kPa, 60 kPa, 65 kPa, 70 kPa, 75 kPa, 80 kPa, 85 kPa, 90 kPa, 95 kPa, or 100 kPa, for example, 20 kPa to 80 kPa, or 20 kPa to 70 kPa. Within this range, the adhesive film can exhibit good flexural reliability at room temperature and does not cause generation of cracks on a screen of a flexible apparatus while facilitating improvement in impact resistance, when stacked on an adherend and used in the flexible apparatus at 25° C.

In an embodiment, the adhesive film may have a modulus at −20° C. of about 50 kPa to about 1,000 kPa, for example, 50 kPa, 100 kPa, 150 kPa, 200 kPa, 250 kPa, 300 kPa, 350 kPa, 400 kPa, 450 kPa, 500 kPa, 550 kPa, 600 kPa, 650 kPa, 700 kPa, 750 kPa, 800 kPa, 850 kPa, 900 kPa, 950 kPa, or 1,000 kPa, for example, 50 kPa to 500 kPa, and, in an embodiment, 50 kPa to 300 kPa, and, in an embodiment, 50 kPa to 250 kPa. Within this range, the adhesive film can exhibit good flexural reliability at low temperature while assisting in improvement in impact resistance, when stacked on an adherend and used in the flexible apparatus.

In an embodiment, the adhesive film may have a modulus at 60° C. of about 10 kPa to about 200 kPa, for example, 10 kPa, 15 kPa, 20 kPa, 25 kPa, 30 kPa, 35 kPa, 40 kPa, 45 kPa, 50 kPa, 55 kPa, 60 kPa, 65 kPa, 70 kPa, 75 kPa, 80 kPa, 85 kPa, 90 kPa, 95 kPa, 100 kPa, 105 kPa, 110 kPa, 115 kPa, 120 kPa, 125 kPa, 130 kPa, 135 kPa, 140 kPa, 145 kPa, 150 kPa, 155 kPa, 160 kPa, 165 kPa, 170 kPa, 175 kPa, 180 kPa, 185 kPa, 190 kPa, 195 kPa, or 200 kPa, for example, 20 kPa to 80 kPa. Within this range, the adhesive film can exhibit good flexural reliability at high temperature while facilitating improvement in impact resistance, when stacked on an adherend and used in the flexible apparatus.

The inorganic particles may have a smaller average particle diameter than the organic particles described below. The inorganic particles having a relatively small average particle diameter can be present between the organic particles to contribute to improvement in impact resistance and flexural reliability over the entire area of the adhesive film while improving optical characteristics over the entire area of the adhesive film.

The inorganic particles may include hollow particles and/or solid particles.

As a result, in an evaluation result of impact resistance measured by a method described below, the adhesive film becomes even over the entire area thereof, thereby improving applicability of the adhesive film.

In an embodiment, a difference in average particle diameter between the inorganic particles and the organic particles may be about 50 nm or more, for example, 50 nm, 55 nm, 60 nm, 65 nm, 70 nm, 75 nm, 80 nm, 85 nm, 90 nm, 95 nm, 100 nm, 105 nm, 110 nm, 115 nm, 120 nm, 125 nm, 130 nm, 135 nm, 140 nm, 145 nm, 150 nm, 155 nm, 160 nm, 165 nm, 170 nm, 175 nm, 180 nm, 185 nm, 190 nm, 195 nm, 200 nm, 205 nm, 210 nm, 215 nm, 220 nm, 225 nm, 230 nm, 235 nm, 240 nm, 245 nm, 250 nm, 255 nm, 260 nm, 265 nm, 270 nm, 275 nm, 280 nm, 285 nm, 290 nm, 295 nm, or 300 nm, for example, 50 nm to 300 nm, or 50 nm to 250 nm. Within this range, the inorganic particles and the organic particles can be easily obtained and can contribute to improvement in impact resistance while improving flexural reliability and optical characteristics of the adhesive film.

In an embodiment, the inorganic particles are inorganic nanoparticles and may have an average particle diameter of about 10 nm to about 1,000 nm, for example, 10 nm, 15 nm, 20 nm, 25 nm, 30 nm, 35 nm, 40 nm, 45 nm, 50 nm, 55 nm, 60 nm, 65 nm, 70 nm, 75 nm, 80 nm, 85 nm, 90 nm, 95 nm, 100 nm, 150 nm, 200 nm, 250 nm, 300 nm, 350 nm, 400 nm, 450 nm, 500 nm, 550 nm, 600 nm, 650 nm, 700 nm, 750 nm, 800 nm, 850 nm, 900 nm, 950 nm, or 1,000 nm, for example, 10 nm to 500 nm, or 10 nm to 100 nm.

In an embodiment, an absolute value of a difference in index of refraction between the inorganic particles and the organic particles may be about 0.1 or less, for example, 0.01, 0.02, 0.03, 0.04, 0.05, 0.06, 0.07, 0.08, 0.09, 0.1, for example, 0.05 to 0.1. Within this range, the inorganic particles and the organic particles can reduce haze of the adhesive film, thereby improving optical characteristics thereof.

The inorganic particles may include inorganic particles formed of a material capable of realizing the absolute value of the difference in index of refraction within the above range. In an embodiment, the inorganic particles may include at least one selected from among metal oxides, such as silica, zirconia, titanium dioxide, tin oxide, antimony pentoxide, and the like; titanates, such as barium titanate, strontium titanate, and the like; and sulfide, selenide, and telluride, such as CdS, CdSe, ZnSe, CdTe, ZnS, HgS, HgSe, PdS, SbSe, and the like. In the adhesive film, these inorganic particles may be used alone or as a mixture thereof in a certain ratio.

In an embodiment, the inorganic particles include silica. Silica may be particularly advantageous in realizing the effects of the present invention even in a small amount when combined with the organic particles described in further detail below. An adhesive film including silicone particles, such as silicone resin particles, silicone rubber particles, or crosslinked silicone particles as the organic particles instead of silica has limitations in achieving all of the advantageous effects of the present invention. Silica may be selected from typical types of silica known to those skilled in the art, such as crystalline silica, amorphous silica, fused silica, and fumed silica. In an embodiment, silica may include particles consisting of silica.

The inorganic particles may include inorganic particles that are subjected to surface treatment or are not subjected to surface treatment. The inorganic particles subjected to surface treatment can facilitate improvement in compatibility with the organic particles described below and a matrix of an adhesive film. Surface treatment may be performed using a (meth)acrylate compound, without being limited thereto.

The organic particles can improve flexural reliability of the adhesive film in a broad range of temperature including low temperature and high temperature. In particular, the organic nanoparticles can further improve reliability of the adhesive film at high temperature by preventing or substantially preventing peeling, slight lifting, and/or bubble generation of the adhesive film at high temperature through increase in modulus of the adhesive film at high temperature. The organic nanoparticles have a high glass transition temperature to increase the modulus of the adhesive film at high temperature.

In an embodiment, the organic particles are organic nanoparticles and may have an average particle diameter of about 100 nm to about 1,000 nm, for example, 100 nm, 150 nm, 200 nm, 250 nm, 300 nm, 350 nm, 400 nm, 450 nm, 500 nm, 550 nm, 600 nm, 650 nm, 700 nm, 750 nm, 800 nm, 850 nm, 900 nm, 950 nm, or 1,000 nm, and, in an embodiment, 100 nm to 900 nm, and, in an embodiment, 100 nm to 500 nm, and, in an embodiment, 100 nm to 400 nm, and, in an embodiment, 100 nm to 300 nm. Within this range, the organic particles do not provide an adverse effect on foldability of the adhesive film and can secure transparency of the adhesive film by securing a total light transmittance of 90% or more.

In an embodiment, the organic particles may have an index of refraction of about 1.35 to about 1.70, for example, 1.35, 1.40, 1.45, 1.50, 1.55, 1.60, 1.65, or 1.70, and, in an embodiment, about 1.40 to about 1.60. Within this range, the adhesive film can exhibit good transparency.

In an embodiment, a difference in index of refraction between the organic particles and a hydroxyl group-containing (meth)acrylic copolymer or a monomer mixture for the hydroxyl group-containing (meth)acrylic copolymer described below may be about 0.1 or less, for example, 0, 0.01, 0.02, 0.03, 0.04, 0.05, 0.06, 0.07, 0.08, 0.09, or 0.1, and, in an embodiment, 0 to 0.05, and, in an embodiment, 0 to 0.02. Within this range, the adhesive film can exhibit good transparency.

The organic nanoparticles may have a core-shell structure or a simple structure, such as bead type nanoparticles, without being limited thereto. In an embodiment, the organic nanoparticles may have a core-shell structure, in which the core and the shell satisfy the following Equation 1. That is, the organic nanoparticles may include nanoparticles in which both the core and the shell are formed of organic materials. With the organic nanoparticles having the core-shell structure, the adhesive film can exhibit good foldability and balance between elasticity and flexibility:

$$Tg(c)<Tg(s),\qquad \text{Equation 1}$$

where Tg(c) is the glass transition temperature (unit: ° C.) of the core, and Tg(s) is the glass transition temperature (unit: ° C.) of the shell.

Herein, the term "shell" means an outermost layer of the organic nanoparticle. The core may be a spherical particle. In some embodiments, the core may include an additional layer surrounding the spherical particle so long as the core has a glass transition temperature satisfying the above relation.

In an embodiment, the core may have a glass transition temperature of about −150° C. to 10° C., and, in an embodiment, about −150° C. to about −5° C., and, in an embodiment, about −150° C. to about −20° C. Within this range, the adhesive film can have good viscoelasticity at low temperature and/or at room temperature. The core may include at least one selected from among poly(alkyl acrylate), polysiloxane, and polybutadiene, each having a glass transition temperature within this range.

The poly(alkyl acrylate) may include at least one selected from among poly(methyl acrylate), poly(ethyl acrylate), poly(propyl acrylate), poly(butyl acrylate), poly(isopropyl acrylate), poly(hexyl acrylate), poly(hexyl methacrylate), poly(ethylhexyl acrylate), poly(ethylhexyl methacrylate), and polysiloxane, without being limited thereto.

The polysiloxane may be, for example, an organosiloxane (co)polymer. The organosiloxane (co)polymer may be a non-crosslinked or crosslinked organosiloxane (co)polymer. The crosslinked organosiloxane (co)polymer may be used to secure impact resistance and colorability. In an embodiment, the crosslinked organosiloxane (co)polymer may include any of crosslinked dimethylsiloxane, methylphenylsiloxane, diphenylsiloxane, and mixtures thereof. In an embodiment, with a copolymer of two or more organosiloxanes, the nanoparticles may have an index of refraction of about 1.41 to about 1.50.

A crosslinked state of the organosiloxane (co)polymer may be determined based on the degree of dissolution in various organic solvents. As the degree of crosslinking of the organosiloxane (co)polymer intensifies, the degree of dissolution of the organosiloxane (co)polymer is reduced. A solvent for determination of the crosslinked state may include acetone, toluene, and the like. The organosiloxane (co)polymer may have a moiety that is not dissolved in acetone or toluene. In an embodiment, the organosiloxane copolymer may include about 30% or more of insolubles in toluene.

The organosiloxane (co)polymer may further include an alkyl acrylate crosslinked polymer. The alkyl acrylate crosslinked polymer may include any of methyl acrylate, ethyl acrylate, n-butyl acrylate, 2-ethylhexyl acrylate, and the like. For example, the alkyl acrylate crosslinked polymer may be n-butyl acrylate or 2-ethylhexyl acrylate, which has a low glass transition temperature.

In an embodiment, the shell may have a glass transition temperature of about 15° C. to about 150° C., and, in an embodiment, about 35° C. to about 150° C., and, in an embodiment, about 50° C. to about 140° C. Within this range, the organic nanoparticles can exhibit good dispersion in the acrylic copolymer. The shell may include poly(alkyl methacrylate) having a glass transition temperature within this range. For example, the shell may include at least one selected from among poly(methyl methacrylate) (PMMA), poly(ethyl methacrylate), poly(propyl methacrylate), poly(butyl methacrylate), poly(isopropyl methacrylate), poly(isobutyl methacrylate), and poly(cyclohexyl methacrylate), without being limited thereto.

In an embodiment, in the organic nanoparticles, the core may be present in an amount of about 30 wt % to about 99 wt %, for example, 30 wt %, 35 wt %, 40 wt %, 45 wt %, 50 wt %, 55 wt %, 60 wt %, 65 wt %, 70 wt %, 75 wt %, 80 wt %, 85 wt %, 90 wt %, 95 wt %, or 99 wt %, and, in an embodiment, 40 wt % to 95 wt %, and, in an embodiment, 50 wt % to 90 wt %. Within this range, the adhesive film can exhibit good foldability in a broad temperature range. In an embodiment, in the organic nanoparticles, the shell may be present in an amount of about 1 wt % to about 70 wt %, for example, 1 wt %, 5 wt %, 10 wt %, 15 wt %, 20 wt %, 25 wt %, 30 wt %, 35 wt %, 40 wt %, 45 wt %, 50 wt %, 55 wt %, 60 wt %, 65 wt %, or 70 wt %, specifically 5 wt % to 60 wt %, more specifically 10 wt % to 50 wt %. Within this range, the adhesive film can exhibit good foldability in a broad temperature range.

The organic nanoparticles may be prepared by typical emulsion polymerization, suspension polymerization, or solution polymerization.

In an embodiment, in the adhesive film, the organic particles may be present in the same amount as the inorganic particles. For example, in the adhesive film, the organic particles may be present in an amount of about 0.1 wt % to about 10 wt %, for example, 0.1 wt %, 0.5 wt %, 1 wt %, 1.5 wt %, 2 wt %, 2.5 wt %, 3 wt %, 3.5 wt %, 4 wt %, 4.5 wt %, 5 wt %, 5.5 wt %, 6 wt %, 6.5 wt %, 7 wt %, 7.5 wt %, 8 wt %, 8.5 wt %, 9 wt %, 9.5 wt %, or 10 wt %, and, in an embodiment, 0.5 wt % to 10 wt %. Within this range, the organic particles can secure high modulus of the adhesive film at high temperature and good foldability of the adhesive film at room temperature and high temperature while securing good viscoelasticity at low temperature and/or at room temperature.

In an embodiment, in the adhesive film, the organic particles may be present in an amount of about 50 parts by weight to about 150 parts by weight, for example, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100, 101, 102, 103, 104, 105, 106, 107, 108, 109, 110, 111, 112, 113, 114, 115, 116, 117, 118, 119, 120, 121, 122, 123, 124, 125, 126, 127, 128, 129, 130, 131, 132, 133, 134, 135, 136, 137, 138, 139, 140, 141, 142, 143, 144, 145, 146, 147, 148, 149, or 150 parts by weight, and, in an embodiment, 80 parts by weight to 140 parts by weight, and, in an embodiment, 100 parts by weight to 130 parts by weight, relative to 100 parts by weight of the inorganic particles. Within this range, the organic particles can secure good impact resistance and foldability of the adhesive film.

The adhesive film is a (meth)acrylic adhesive film and may be produced from an adhesive composition that includes the inorganic particles, the organic particles, and a polymerized product of a monomer mixture for a hydroxyl group-containing (meth)acrylic copolymer.

In an embodiment, the adhesive film may be produced from an adhesive composition that includes the inorganic particles, the organic particles, and the hydroxyl group-containing (meth)acrylic copolymer.

The hydroxyl group-containing (meth)acrylic copolymer forms a matrix of the adhesive film and can impart peel strength to the adhesive film. The monomer mixture may include a hydroxyl group-containing (meth)acrylate and an alkyl group-containing (meth)acrylate.

The hydroxyl group-containing (meth)acrylate can impart peel strength to the adhesive film. The hydroxyl group-containing (meth)acrylate may be a substituted or unsubstituted $C_1$ to $C_{10}$ (meth)acrylate containing at least one hydroxyl group at an ester site. For example, the hydroxyl group-containing (meth)acrylate may include at least one selected from among 2-hydroxybutyl (meth)acrylate, 4-hydroxybutyl (meth)acrylate, 2-hydroxyethyl (meth)acrylate, 1-hydroxypropyl (meth)acrylate, 2-hydroxypropyl (meth)acrylate, 3-hydroxypropyl (meth)acrylate, and 6-hydroxyhexyl (meth)acrylate. Preferably, the hydroxyl group-containing (meth)acrylate includes 2-hydroxypropyl (meth)acrylate and/or 4-hydroxybutyl (meth)acrylate. In this case, the effects of the present invention can be more efficiently realized.

In an embodiment, the hydroxyl group-containing (meth)acrylate may have a glass transition temperature of about −80° C. to about 0° C., for example, −80° C., −75° C., −70° C., −65° C., −60° C., −55° C., −50° C., −45° C., −40° C., −35° C., −30° C., −25° C., −20° C., −15° C., −10° C., −5° C., or 0° C., and, in an embodiment, from −70° C. to −10° C., and, in an embodiment, from −60° C. to −10° C., in a homopolymer phase. Within this range, the hydroxyl group-containing (meth)acrylate can improve peel strength and flexural reliability of the adhesive film.

In an embodiment, the hydroxyl group-containing (meth)acrylate may be present in an amount of about 1 wt % to about 30 wt %, and, in an embodiment, 1 wt %, 2 wt %, 3 wt %, 4 wt %, 5 wt %, 6 wt %, 7 wt %, 8 wt %, 9 wt %, 10 wt %, 11 wt %, 12 wt %, 13 wt %, 14 wt %, 15 wt %, 16 wt %, 17 wt %, 18 wt %, 19 wt %, 20 wt %, 21 wt %, 22 wt %, 23 wt %, 24 wt %, 25 wt %, 26 wt %, 27 wt %, 28 wt %, 29 wt %, or 30 wt %, for example, 3 wt % to 25 wt %, and, in an embodiment, 5 wt % to 20 wt %, in the monomer mixture. Within this range, the hydroxyl group-containing (meth)acrylate can facilitate achieving peel strength of the adhesive film.

The alkyl group-containing (meth)acrylate can form a matrix of the adhesive film. In an embodiment, the alkyl group-containing (meth)acrylate includes an unsubstituted linear or branched (meth)acrylate containing a substituted or unsubstituted $C_1$ to $C_{10}$ alkyl group at an ester site. For example, the alkyl group-containing (meth)acrylate may include at least one selected from among 2-ethylhexyl (meth)acrylate, n-butyl (meth)acrylate, isooctyl (meth)acrylate, propyl (meth)acrylate, t-butyl (meth)acrylate, isobutyl (meth)acrylate, pentyl (meth)acrylate, hexyl (meth)acrylate, heptyl (meth)acrylate, octyl (meth)acrylate, nonyl (meth) acrylate, and decyl (meth)acrylate. In an embodiment, the alkyl group-containing (meth)acrylate is an unsubstituted branched type and includes 2-ethylhexyl (meth)acrylate and/or isooctyl (meth)acrylate, and, in an embodiment, 2-ethylhexyl (meth)acrylate.

In an embodiment, the alkyl group-containing (meth) acrylate may have a glass transition temperature of about −80° C. to about −20° C., for example, −80° C., −75° C., −70° C., −65° C., −60° C., −55° C., −50° C., −45° C., −40° C., −35° C., −30° C., −25° C., or −20° C., and, in an embodiment, −80° C. to −40° C., in a homopolymer phase. Within this range, the adhesive film can secure good flexural reliability at low temperature and under high temperature/humidity conditions.

In the monomer mixture, the alkyl group-containing (meth)acrylate may be present in an amount of about 50 wt % to about 90 wt %, for example, 50 wt %, 51 wt %, 52 wt %, 53 wt %, 54 wt %, 55 wt %, 56 wt %, 57 wt %, 58 wt %, 59 wt %, 60 wt %, 61 wt %, 62 wt %, 63 wt %, 64 wt %, 65 wt %, 66 wt %, 67 wt %, 68 wt %, 69 wt %, 70 wt %, 71 wt %, 72 wt %, 73 wt %, 74 wt %, 75 wt %, 76 wt %, 77 wt %, 78 wt %, 79 wt %, 80 wt %, 81 wt %, 82 wt %, 83 wt %, 84 wt %, 85 wt %, 86 wt %, 87 wt %, 88 wt %, 89 wt %, or 90 wt %, and, in an embodiment, 50 wt % to 85 wt %, or 60 wt % to 85 wt %. Within this range, the adhesive film can secure good flexural reliability at low temperature and under high temperature/humidity conditions.

In an embodiment, the monomer mixture may further include an alkylene oxide group-containing monomer in addition to the hydroxyl group-containing (meth)acrylate and the alkyl group-containing (meth)acrylate. The alkylene oxide group-containing monomer allows the adhesive film including both the inorganic particles and the organic particles to more easily realize all effects of the present invention.

The alkylene oxide group-containing monomer may include an ethylene oxide-containing monomer and/or a propylene oxide-containing monomer.

The ethylene oxide-containing monomer may include at least one ethylene oxide (—CH$_2$CH$_2$O—)-containing (meth)acrylate monomer. For example, the ethylene oxide-containing monomer may be a poly(ethylene oxide) alkyl ether (meth)acrylate, such as any of poly(ethylene oxide) monomethyl ether (meth)acrylate, poly(ethylene oxide) monoethyl ether (meth)acrylate, poly(ethylene oxide) monopropyl ether (meth)acrylate, poly(ethylene oxide) monobutyl ether (meth)acrylate, poly(ethylene oxide) monopentyl ether (meth)acrylate, poly(ethylene oxide) dimethyl ether (meth)acrylate, poly(ethylene oxide) diethyl ether (meth)acrylate, poly(ethylene oxide) mono-isopropyl ether (meth)acrylate, poly(ethylene oxide) mono-isobutyl ether (meth)acrylate, and poly(ethylene oxide) mono-t-butyl ether (meth)acrylate, without being limited thereto.

The propylene oxide-containing monomer may be a poly(propylene oxide) alkyl ether (meth)acrylate, such as any of poly(propylene oxide) monomethyl ether (meth)acrylate, poly(propylene oxide) monoethyl ether (meth)acrylate, poly(propylene oxide) monopropyl ether (meth)acrylate, poly(propylene oxide) monobutyl ether (meth)acrylate, poly(propylene oxide) monopentyl ether (meth)acrylate, poly(propylene oxide) dimethyl ether (meth)acrylate, poly(propylene oxide) diethyl ether (meth)acrylate, poly(propylene oxide) mono-isopropyl ether (meth)acrylate, poly(propylene oxide) mono-isobutyl ether (meth)acrylate, and poly(propylene oxide) mono-t-butyl ether (meth)acrylate, without being limited thereto.

In an embodiment, in the monomer mixture, the alkylene oxide group-containing monomer may be present in an amount of about 1 wt % to about 30 wt %, for example, 1 wt %, 2 wt %, 3 wt %, 4 wt %, 5 wt %, 6 wt %, 7 wt %, 8 wt %, 9 wt %, 10 wt %, 11 wt %, 12 wt %, 13 wt %, 14 wt %, 15 wt %, 16 wt %, 17 wt %, 18 wt %, 19 wt %, 20 wt %, 21 wt %, 22 wt %, 23 wt %, 24 wt %, 25 wt %, 26 wt %, 27 wt %, 28 wt %, 29 wt %, or 30 wt %, and, in an embodiment, 5 wt % to 25 wt %, or 10 wt % to 20 wt %. Within this range, the alkylene oxide group-containing monomer can facilitate improvement in impact resistance and flexural reliability of the adhesive film.

In an embodiment, the hydroxyl group-containing (meth) acrylate, the alkyl group-containing (meth)acrylate and the alkylene oxide group-containing monomer may be present in a total amount of about 95 wt % or more, for example, about 98 wt % to 100 wt %, in the monomer mixture.

The monomer mixture may further include a copolymerizable monomer. The copolymerizable monomer may be added to the monomer mixture or to the hydroxyl group-containing (meth)acrylic copolymer to provide additional effects to the adhesive film. The copolymerizable monomer is different from the above monomers and may include at least one selected from among an amine group-containing monomer, an alkoxy group-containing monomer, a phosphoric acid group-containing monomer, a sulfonic acid group-containing monomer, a phenyl group-containing monomer, a silane group-containing monomer, a carboxylic acid group-containing monomer, and an amide group monomer.

The amine group-containing monomer may be an amine group-containing (meth)acrylic monomer, such as any of monomethyl aminoethyl acrylate, monoethyl aminoethyl acrylate, monomethyl aminopropyl acrylate, monoethyl aminopropyl acrylate, dimethyl aminoethyl acrylate, diethyl aminoethyl acrylate, N-tert-butyl aminoethyl acrylate, and acryloxyethyl trimethyl ammonium chloride acrylate, without being limited thereto.

The alkoxy group-containing monomer may include any of 2-methoxyethyl acrylate, 2-methoxypropyl acrylate, 2-ethoxypropyl acrylate, 2-buthoxypropyl acrylate, 2-methoxypentyl acrylate, 2-ethoxypentyl acrylate, 2-buthoxyhexyl acrylate, 3-methoxypentyl acrylate, 3-ethoxypentyl acrylate, and 3-buthoxyhexyl acrylate, without being limited thereto.

The phosphoric acid group-containing monomer may be a phosphoric acid group-containing acrylic monomer, such as any of 2-methacryloyloxyethyl diphenyl phosphate acrylate, trimethacryloyloxyethyl phosphate acrylate, and triacryloyloxyethyl phosphate acrylate, without being limited thereto.

The sulfonic acid group-containing monomer may be a sulfonic acid group-containing acrylic monomer, such as any of sodium sulfopropyl acrylate, sodium 2-sulfoethyl acrylate, and sodium 2-acrylamido-2-methylpropane sulfonate, without being limited thereto.

The phenyl group-containing monomer may be a phenyl group-containing acrylic vinyl monomer, such as any of p-tert-butyl phenyl acrylate, o-biphenyl acrylate, and phenoxy ethyl acrylate, without being limited thereto.

The silane group-containing monomer may be a silane group-containing vinyl monomer, such as any of 2-acetoacetoxyethyl acrylate, vinyl trimethoxysilane, vinyl triethoxysilane, vinyl tris(2-methoxyethyl)silane, vinyl triacetoxysilane, and acryloyloxypropyl trimethoxysilane, without being limited thereto.

The carboxylic acid group-containing monomer may include any of acrylic acid, 2-carboxyethyl acrylate, 3-carboxypropyl acrylate, 4-carboxybutyl acrylate, itaconic acid, crotonic acid, maleic acid, fumaric acid, and maleic anhydride, without being limited thereto.

The amide group-containing monomer may include any of acrylamide, N-methylacrylamide, N-methylolacrylamide, N-methoxymethylacrylamide, N,N-methylenebisacrylamide, N-hydroxyethylacrylamide, and N,N-diethylacrylamide, without being limited thereto.

In an embodiment, in the monomer mixture, the copolymerizable monomer may be present in an amount of 30 wt % or less, and, in an embodiment, 0 wt % to 30 wt %. The copolymerizable monomer may be used to adjust adhesion of the adhesive film to an adherend while providing optical characteristics to the adhesive film.

The adhesive composition may further include a photoinitiator.

The photoinitiator serves to form an adhesive film by curing the adhesive composition or to form the hydroxyl group-containing (meth)acrylic copolymer through polymerization of the monomer mixture in the adhesive composition.

The photoinitiator may be selected from any initiators so long as the initiator can induce polymerization or curing of a radical polymerizable compound upon photocuring. For example, the photoinitiator may be a photo-radical initiator and may include any of benzoin, hydroxy ketone, amino ketone, phosphine oxide photoinitiators, and the like. In an embodiment, the photoinitiator may include any of benzoin, benzoin methyl ether, benzoin ethyl ether, benzoin isopropyl ether, benzoin n-butyl ether, benzoin isobutyl ether, acetophenone compounds, such as 2,2-dimethoxy-2-phenyl acetophenone, 2,2'-diethoxy acetophenone, 2,2'-dibuthoxy acetophenone, 2-hydroxy-2-methyl propiophenone, p-t-butyl trichloroacetophenone, p-t-butyl dichloroacetophenone, 4-chloroacetophenone, 2,2'-dichloro-4-phenoxyacetophenone, dimethylaminoacetophenone, 2,2-dimethoxy-2-phenyl acetophenone, and 2,2-diethoxy-2-phenyl acetophenone, 2-hydroxy-2-methyl-1-phenylpropane-1-one, 2-benzyl-2-dimethyl amino-1-(4-morpolynophenyl)-butane-1-one, 1-hydroxycyclohexylphenylketone, 2-methyl-1-[4-(methylthio)phenyl]-2-morpholino-propane-1-one, 4-(2-hydroxyethoxy)phenyl-2-(hydroxy-2-propyl) ketone, benzophenone, p-phenyl benzophenone, 4,4-diethylaminobenzophenone, dichlorobenzophenone, 2-methylanthraquinone, 2-ethylanthraquinone, 2-t-butylanthraquinone, 2-aminoanthraquinone, 2-methylthioxanthone, 2-ethylthioxanthone, 2-chlorothioxanthone, 2,4-dimethylthioxanthone, 2,4-diethylthioxanthone, benzyl dimethyl ketal, acetophenone dimethyl ketal, p-dimethylamino benzoic acid ester, oligo[2-hydroxy-2-methyl-1-[4-(1-methylvinyl)phenyl]propanone], 2,4,6-trimethylbenzoyl-diphenyl-phosphine oxide, and the like.

In an embodiment, the photoinitiator may be present in an amount of about 0.0001 parts by weight to about 5 parts by weight, and, in an embodiment, about 0.001 parts by weight to about 3 parts by weight, and, in an embodiment, about 0.001 parts by weight to about 1 part by weight, relative to 100 parts by weight of the monomer mixture or the hydroxyl group-containing (meth)acrylic copolymer. Within this range, the photoinitiator allows complete curing of the adhesive composition without deterioration in transmittance of the adhesive film due to residual initiator, can reduce bubble generation, and can exhibit good reactivity.

The adhesive composition may further include a crosslinking agent.

The crosslinking agent can improve mechanical strength of the adhesive film through improvement in crosslinking degree of the adhesive composition.

The crosslinking agent may include a polyfunctional (meth)acrylate as a photocurable crosslinking agent capable of being cured by actinic radiation. For example, the crosslinking agent may include any of bifunctional (meth)acrylates, such as 1,4-butanediol di(meth)acrylate, 1,6-hexanediol di(meth)acrylate, 1,8-octanediol di(meth)acrylate, neopentyl glycol di(meth)acrylate, polyethylene glycol di(meth)acrylate, neopentyl glycol adipate di(meth)acrylate, dicyclopentanyl di(meth)acrylate, caprolactone-modified dicyclopentenyl di(meth)acrylate, ethylene oxide-modified di(meth)acrylate, di(meth)acryloxyethyl isocyanurate, allylated cyclohexyl di(meth)acrylate, tricyclodecane dimethanol (meth)acrylate, dimethylol dicyclopentane di(meth) acrylate, ethylene oxide-modified hexahydrophthalic acid di(meth)acrylate, tricyclodecane dimethanol (meth)acrylate, neopentyl glycol-modified trimethylpropane di(meth)acrylate, adamantane di(meth)acrylate, and 9,9-bis[4-(2-acryloyloxyethoxy)phenyl]fluorine; trifunctional (meth)acrylates, such as trimethylolpropane tri(meth)acrylate, dipentaerythritol tri(meth)acrylate, propionic acid-modified dipentaerythritol tri(meth)acrylate, pentaerythritol tri(meth)acrylate, propylene oxide-modified trimethylolpropane tri(meth)acrylate, trifunctional urethane (meth)acrylates, and tris (meth)acryloxyethyl isocyanurate; tetrafunctional (meth)acrylates, such as diglycerin tetra(meth)acrylate and pentaerythritol tetra(meth)acrylate; pentafunctional (meth)acrylates, such as dipentaerythritol penta(meth)acrylate; and hexafunctional (meth)acrylates, such as dipentaerythritol hexa(meth)acrylate, caprolactone-modified dipentaerythritol hexa(meth)acrylate, and urethane (meth)acrylates (e.g. a reaction product of an isocyanate monomer and trimethylolpropane tri(meth)acrylate), without being limited thereto.

In an embodiment, the crosslinking agent includes a di(meth)acrylate containing an unsubstituted $C_2$ to $C_{20}$ alkylene group, and, in an embodiment, an unsubstituted $C_4$ to $C_{12}$ alkylene group. As a result, the crosslinking agent can further improve flexural reliability of the adhesive film. For example, the crosslinking agent may include at least one selected from among 1,4-butanediol di(meth)acrylate, 1,6-hexanediol di(meth)acrylate, and 1,8-octanediol (meth)acrylate.

In an embodiment, relative to 100 parts by weight of the monomer mixture or the hydroxyl group-containing (meth) acrylic copolymer, the crosslinking agent may be present in an amount of 0.001 parts by weight to 5 parts by weight, for example, 0.001, 0.005, 0.01, 0.05, 0.1, 0.15, 0.2, 0.25, 0.3, 0.35, 0.4, 0.45, 0.5, 0.55, 0.6, 0.65, 0.7, 0.75, 0.8, 0.85, 0.9, 0.95, 1, 2, 3, 4, or 5 parts by weight, and, in an embodiment, 0.003 parts by weight to 3 parts by weight, and, in an embodiment, 0.003 parts by weight to 1 part by weight. Within this range, the crosslinking agent can secure good peel strength of the adhesive film while improving reliability thereof.

The adhesive film may be produced by coating the adhesive composition onto a release film, followed by photocuring. Photocuring may be performed under a low-pressure lamp at a wavelength of 300 nm to 400 nm (e.g. UV light) and at a dose of 400 mJ/cm$^2$ to 3,000 mJ/cm$^2$ in an oxygen-free state. In irradiation with light, the quantity and wavelength of light may be changed depending upon the thickness of the adhesive film and irradiation conditions.

Optical Member

An optical member according to one or more embodiments of the present invention includes an adherend and an adhesive film according to an embodiment of the present invention stacked on at least one surface of the adherend.

The adherend may include a typical adherend known to those skilled in the art. For example, the adherend may include any of a thin glass plate, an optical film including a plastic film, and the like.

In an embodiment, the adherend may include the aforementioned polyurethane film. In an embodiment, the polyurethane film may have a thickness of 75 μm to 200 μm, and, in an embodiment, 100 μm to 150 μm. Within this range, the polyurethane film can provide improvement in impact resistance and flexural reliability.

Optical Display Apparatus

An optical display apparatus according to one or more embodiments of the present invention includes an adhesive film according to an embodiments of the present invention or an optical member according to an embodiment of the present invention.

An optical display apparatus according to an embodiment may include an organic light emitting diode display, a liquid crystal display, and the like. In an embodiment, the optical display apparatus may include a flexible display apparatus. In another embodiment, the optical display apparatus may include a non-flexible display apparatus.

Next, the embodiments of the present invention will be described in further detail with reference to some examples. However, it is to be understood that these examples are provided for illustration and should not be construed in any way as limiting the present invention.

Preparative Example 1: Preparation of Organic Nanoparticles

Organic nanoparticles were prepared by emulsion polymerization. A core was formed of poly(butyl acrylate), and a shell was formed of poly(methyl methacrylate). In the organic nanoparticles, the shell was present in an amount of 35 wt %, and the core was present in an amount of 65 wt %. The organic nanoparticles satisfied Equation 2 and had an average particle diameter of 250 nm and an index of refraction of 1.48.

Preparative Example 2: Preparation of Organic Nanoparticles

Organic nanoparticles were prepared by emulsion polymerization. A core was formed of poly(butyl acrylate), and a shell was formed of poly(methyl methacrylate). In the organic nanoparticles, the shell was present in an amount of 35 wt %, and the core was present in an amount of 65 wt %. The organic nanoparticles satisfied Equation 2 and had an average particle diameter of 100 nm and an index of refraction of 1.48.

Example 1

In a reactor, 0.005 parts by weight of a photoinitiator (Omnirad 651, 2,2-dimethoxy-2-phenylacetophenone, IGM) was evenly mixed with 100 parts by weight of a monomer mixture, which comprises 75 parts by weight of 2-ethylhexyl acrylate (EHA), 15 parts by weight of 2-hydroxypropyl acrylate (HOP-A), and 10 parts by weight of ethoxy diethylene glycol acrylate (EC-A). After replacing dissolved oxygen in the reactor with nitrogen gas, the monomer mixture was subjected to partial polymerization through irradiation with UV light for several minutes under a low-pressure mercury lamp, thereby preparing a viscous liquid having a viscosity of 500 cP to 5,000 cP at 25° C. The viscous liquid may include a non-polymerized monomer and a hydroxyl group-containing (meth)acrylic partial copolymer prepared through partial polymerization of some of the monomer mixture.

Relative to 100 parts by weight of the monomer mixture, 1.5 parts by weight of the organic nanoparticles prepared in Preparative Example 1, 0.3 parts by weight of a photoinitiator (Omnirad 651), 1.5 parts by weight of inorganic nanoparticles (silica having an average particle diameter of 15 nm), and 0.1 parts by weight of an acrylic crosslinking agent (MF-001, DKS) were added to the prepared viscous liquid and mixed therewith, followed by degassing, thereby preparing an adhesive composition.

The adhesive composition was coated onto a polyethylene terephthalate (PET) release film (thickness: 75 μm). Then, a polyethylene terephthalate release film (thickness: 75 μm) was stacked on the coating layer, followed by irradiation with UV light at a dose of 2,000 mJ/cm$^2$, thereby preparing an adhesive sheet of the PET release film (thickness: 75 μm)/adhesive film (thickness: 25 μm)/PET release film (thickness: 75 μm).

The following Table 1 shows the content of each of components used in preparation of the adhesive composition based on a solid content of 100% and represented in parts by weight. Here, "-" means that a corresponding component is not present.

Examples 2 and 3 and Example 6

Adhesive sheets of a PET release film/adhesive film/PET release film were prepared in the same manner as in Example 1 except that the components of the adhesive composition were changed as listed in Table 1.

Examples 4 and 5

Inorganic nanoparticles (silica having an average particle size of 50 nm) were used. Adhesive sheets of a PET release film/adhesive film/PET release film were prepared in the same manner as in Example 1 except that the components of the adhesive composition were changed as listed in Table 1.

Comparative Examples 1 to 4

Adhesive sheets of a PET release film/adhesive film/PET release film were prepared in the same manner as in Example 1 except that the components of the adhesive composition were changed as listed in Table 1.

The adhesive sheets prepared in the Examples and Comparative Examples were evaluated as to the following properties as listed in Table 1, and evaluation results are shown in Table 1.

Figure 1A:
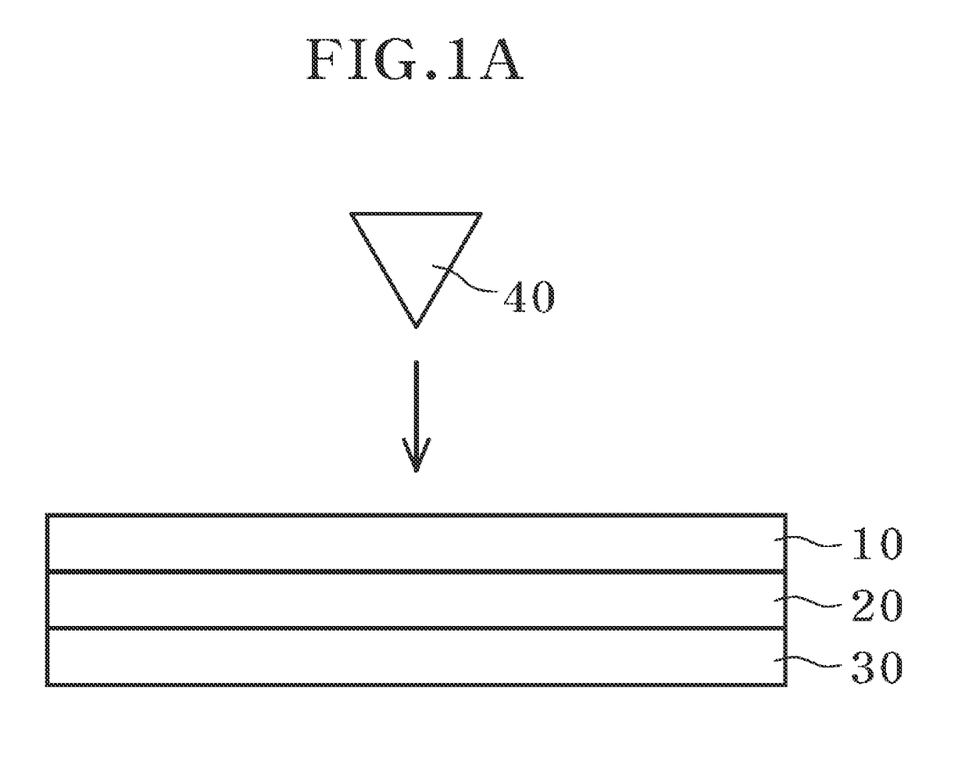
FIGS. 1A and 1B are diagrams illustrating a method for evaluation of impact resistance.
Figure 1B:
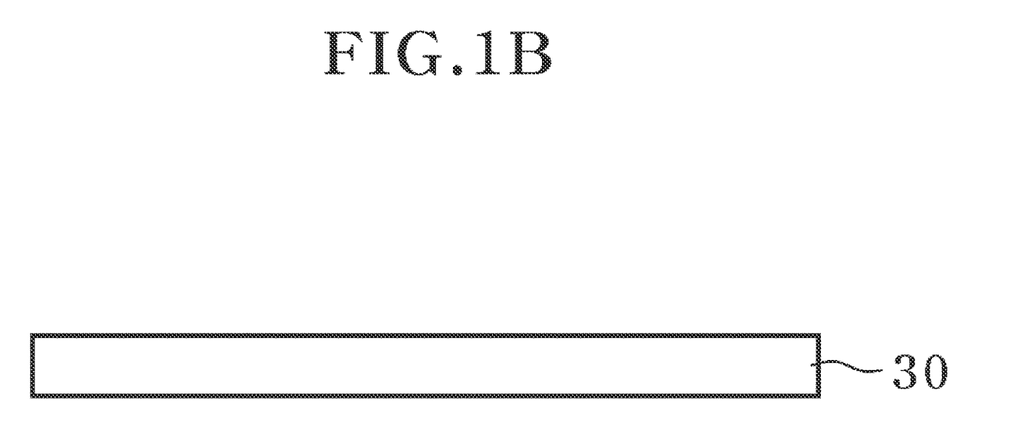

(1) Impact resistance (unit: cm): Impact resistance was measured with reference to FIGS. 1A and 1B. A polyurethane based film (thickness: 100 μm, Young's modulus at 25° C. of 100 MPa, CPU, Tactus) was attached to one surface of the adhesive sheet prepared in each of the Examples and Comparative Examples, from which one PET release film was peeled off. Then, a polyethylene terephthalate film (thickness: 50 μm, SH86, SKC) was attached to the other surface of the adhesive sheet prepared in each of the Examples and Comparative Examples, from which the other PET release film was peeled off, thereby preparing a specimen in which a polyethylene terephthalate film 30, an adhesive film 20, and a polyurethane based film 10 are sequentially stacked, as shown in FIG. 1A. A pen 40 including a ball having a diameter of 0.7 mm and a circular cross-section was dropped onto an upper surface of the polyurethane based film 10 of the specimen in an arrow direction (vertical direction) in FIG. 1A. As shown in FIG. 1B, with the polyurethane based film 10 and the adhesive film 20 removed from the specimen, the presence of a dent on the polyethylene terephthalate film 30 was observed through a 3D microscope (VK-X1100, Keyence Co., Ltd.). An initial dent formation height at which a dent was first formed on the polyethylene terephthalate film was measured. A greater initial dent formation height indicates better impact resistance.

(2) Haze (unit: %): The adhesive film was obtained by removing the PET films from both sides of each of the adhesive sheets prepared in the Examples and Comparative Examples. In measurement of haze, a haze meter (Nippon Denshoku Model NDH 5000) was used. Haze was measured on a 50 μm thick adhesive film in accordance with ASTM D 1003-95 5 ("Standard Test for Haze and Luminous Transmittance of Transparent Plastic").

(3) Flexural reliability: A polyurethane based film (thickness: 100 μm, Young's modulus at 25° C. of 100 MPa, CPU, Tactus) was attached to one surface of the adhesive sheet (rectangular shape having a size of 10 cm×4 cm (length× width)) prepared in each of the Examples and Comparative Examples, from which one release PET was peeled off. Then, a Galaxy Z Flip (Samsung Electronics Co., Ltd.) was attached to the other surface of the adhesive sheet, from which the other release PET was peeled off, thereby preparing a sample. The prepared sample was folded to have a radius of curvature of 1.5 mm at a bent portion thereof towards the polyurethane based film side, left at −20° C. or at 60° C. for 2 hours, and then unfolded to check separation between the adhesive film and the Galaxy Z Flip. No separation therebetween was evaluated as good and even slight separation therebetween was evaluated as poor.

(4) Modulus (unit: kPa): Viscoelasticity was measured at a shear rate of 1 rad/sec and a strain of 1% in the auto-strain mode using a rheometer (ARES G2, TA) as a dynamic viscoelasticity meter. Specifically, multiple adhesive films obtained from the adhesive film fabricated in each of the Examples and Comparative Examples were stacked one above another to form a 800 μm thick laminate. Then, the laminate was punched using an 8 mm-diameter punching machine, thereby preparing a specimen. With a normal force of 1.0 N applied to the specimen using 8 mm jigs, modulus was measured on the specimen while heating the specimen from −60° C. to 90° C. at a heating rate of 5° C./min. Here, modulus at each of −20° C., 25° C., and 80° C. was recorded.

(5) Peel strength (unit: gf/inch): With a polyurethane film (thickness: 100 μm, Young's modulus at 25° C. of 100 MPa, CPU, Tactus) attached to one surface of the adhesive sheet prepared in each of the Examples and Comparative Examples, from which one release PET was peeled off, followed by cutting the adhesive sheet to a size of 10 cm×2.5 cm (length×width). Then, the remaining PET release film was removed from the adhesive sheet, which in turn was attached to an alkali-free glass plate to prepare a specimen in which the alkali-free glass plate, the adhesive film, and the polyurethane film are sequentially stacked in the stated order. The specimen was secured to a peel strength meter (Texture Analyzer (TA) Instrument), followed by measuring peel strength upon separation of the laminate of the adhesive film and the polyurethane film from the alkali-free glass plate at 25° C. under conditions of a peeling rate of 300 mm/min and a peeling angle of 180°.

TABLE 1

| | | Example | | | | | | Comparative Example | | | |
|---|---|---|---|---|---|---|---|---|---|---|---|
| | | 1 | 2 | 3 | 4 | 5 | 6 | 1 | 2 | 3 | 4 |
| Monomer | EHA | 75 | 75 | 75 | 75 | 75 | 75 | 75 | 75 | 75 | 75 |
| | HOP-A | 15 | 15 | 15 | 15 | 15 | 15 | 15 | 15 | 15 | 15 |
| | EC-A | 10 | 10 | 10 | 10 | 10 | 10 | 10 | 10 | 10 | 10 |
| Photoinitiator | | 0.3 | 0.3 | 0.3 | 0.3 | 0.3 | 0.3 | 0.3 | 0.3 | 0.3 | 0.3 |
| Organic nanoparticles | Average particle diameter | 250 | 100 | 250 | 250 | 100 | 250 | — | 250 | 250 | — |
| | Content | 1.5 | 1.5 | 3 | 1.5 | 3 | 5 | — | 1.5 | 1.5 | — |
| Inorganic nanoparticles | Average particle diameter | 15 | 15 | 15 | 50 | 50 | 15 | — | 15 | — | 15 |
| | Content | 1.5 | 1.5 | 3 | 1.5 | 3 | 5 | — | 6 | — | 1.5 |
| MF-001 | | 0.1 | 0.1 | 0.1 | 0.1 | 0.1 | 0.1 | 0.1 | 0.1 | 0.1 | 0.1 |
| Impact resistance | | 4.5 | 4.5 | 5 | 4.5 | 5.5 | 6 | 2 | 6 | 3 | 2.5 |
| Haze | | 0.6 | 0.62 | 0.72 | 0.63 | 0.71 | 0.78 | 0.34 | 1.34 | 0.45 | 0.43 |
| Flexural reliability | @−20° C. | Good | Good | Good | Good | Good | Good | Good | Poor | Good | Good |
| | @60° C. | Good | Good | Good | Good | Good | Good | Good | Poor | Good | Good |
| Modulus | @−20° C. | 200 | 200 | 220 | 230 | 250 | 300 | 180 | 350 | 190 | 210 |
| | @25° C. | 39 | 40 | 44 | 43 | 450 | 58 | 36 | 61 | 39 | 380 |
| | @60° C. | 25 | 24 | 26 | 23 | 27 | 35 | 23 | 45 | 23 | 230 |
| Peel strength | | 450 | 460 | 435 | 440 | 410 | 320 | 480 | 230 | 460 | 450 |

As shown in Table 1, the adhesive film according to embodiments of the present invention exhibited good properties in terms of impact resistance, optical characteristics, and flexural reliability over the entire area thereof.

Accordingly, embodiments of the present invention provide a (meth)acrylic adhesive film having good impact resistance and optical characteristics over the entire area thereof. Further, embodiments of the present invention provide a (meth)acrylic adhesive film having good flexural reliability.

Conversely, the adhesive films of Comparative Examples 1, 2, and 3 prepared without using organic particles and/or inorganic particles exhibited poor impact resistance. Despite the inclusion of the organic particles and the inorganic particles, the adhesive film of Comparative Example 2 prepared using greater than 5 wt % of the inorganic particles had much higher haze, causing poor optical characteristics.

While some embodiments of the present invention have been described herein, it is to be understood that various modifications, changes, alterations, and equivalent embodiments can be made by those skilled in the art without departing from the spirit and scope of the present invention.

What is claimed is:

1. A (meth)acrylic adhesive film comprising organic particles,
    the (meth)acrylic adhesive film further comprising greater than 0 wt % to 3 wt % of inorganic particles in the (meth)acrylic adhesive film, wherein the inorganic particles have a smaller average particle diameter than the organic particles, and a difference in average particle diameter between the inorganic particles and the organic particles is about 50 nm to 300 nm,
    the (meth)acrylic adhesive film having a haze of 1% or less and an initial dent formation height of 4.5 cm or more, as measured on a specimen prepared by sequentially stacking the (meth)acrylic adhesive film having a thickness of 25 μm and a 100 μm thick polyurethane based film having a Young's modulus of 80 MPa to 500 MPa at 25° C. on a 50 μm thick polyethylene terephthalate film,
    wherein the initial dent formation height is a dent depth on the polyethylene terephthalate film upon dropping a pen including a ball having a diameter of 0.7 mm and a circular cross-section onto an upper surface of the polyurethane based film of the specimen in a vertical direction, and
    wherein the (meth)acrylic adhesive film has a modulus of about 50 kPa to about 1,000 kPa at −20° C. and a modulus of about 10 kPa to about 200 kPa at 60° C.

2. The (meth)acrylic adhesive film according to claim 1, wherein the inorganic particles have an average particle diameter of about 10 nm to about 1,000 nm, and the organic particles have an average particle diameter of about 100 nm to about 1,000 nm.

3. The (meth)acrylic adhesive film according to claim 1, wherein the organic particles are present in an amount of about 50 parts by weight to about 150 parts by weight relative to 100 parts by weight of the inorganic particles.

4. The (meth)acrylic adhesive film according to claim 1, wherein the inorganic particles comprise silica.

5. The (meth)acrylic adhesive film according to claim 1, wherein the inorganic particles are not subjected to surface treatment with a (meth)acrylate compound.

6. The (meth)acrylic adhesive film according to claim 1, wherein the organic particles comprise core-shell organic particles satisfying the following Equation 1:

$$Tg(c) < Tg(s),$$

where $Tg(c)$ is a glass transition temperature of a core (unit: °C.), and $Tg(s)$ is a glass transition temperature of a shell (unit: °C.).

7. The (meth)acrylic adhesive film according to claim 1, wherein the organic particles are present in an amount of about 0.1 wt % to about 10 wt % in the (meth)acrylic adhesive film.

8. The (meth)acrylic adhesive film according to claim 1, wherein the (meth)acrylic adhesive film is formed of an adhesive composition comprising the inorganic particles, the organic particles, and a hydroxyl group-containing (meth)acrylic copolymer.

9. The (meth)acrylic adhesive film according to claim 8, wherein the hydroxyl group-containing (meth)acrylic copolymer is a polymerized product of a monomer mixture comprising a hydroxyl group-containing (meth)acrylate and an alkyl group-containing (meth)acrylate.

10. The (meth)acrylic adhesive film according to claim 9, wherein the monomer mixture further comprises an alkylene oxide group-containing monomer.

11. The (meth)acrylic adhesive film according to claim 8, wherein the adhesive composition further comprises at least one selected from among a photoinitiator and a crosslinking agent.

12. An optical member comprising: an adherend; and an adhesive film stacked on at least one surface of the adherend, the adhesive film being the (meth)acrylic adhesive film according to claim 1.

13. The optical member according to claim 12, wherein the adherend comprises a glass plate or a polyurethane based film having a Young's modulus of about 80 MPa to about 500 MPa at 25° C.

14. An optical display apparatus comprising the optical member according to claim 12.

15. The (meth)acrylic adhesive film according to claim 1, wherein the inorganic particles are subjected to surface treatment with a (meth)acrylate compound.

* * * * *